(No Model.)
J. T. MILLER.
DITCHING PLOW.
No. 284,465. Patented Sept. 4, 1883.
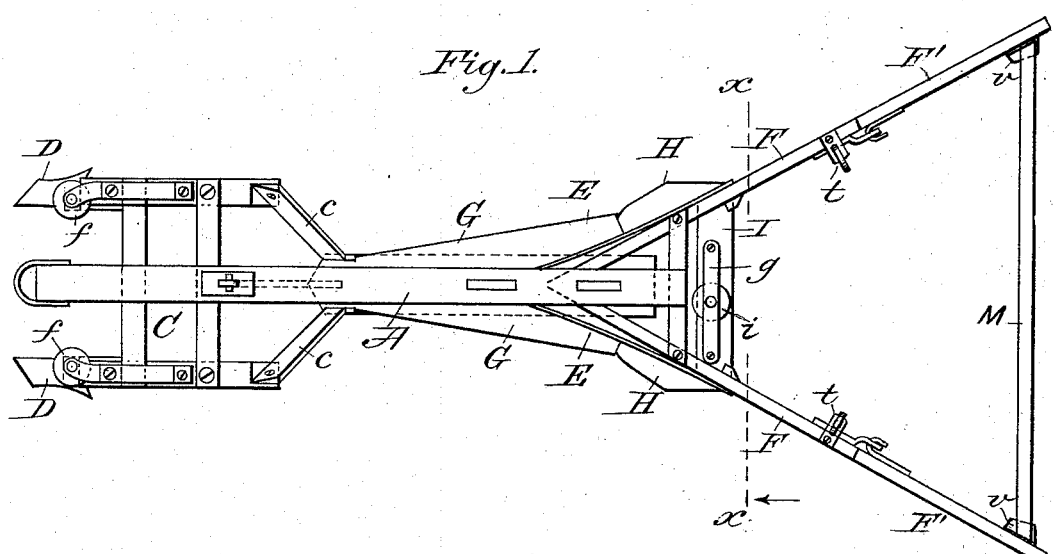
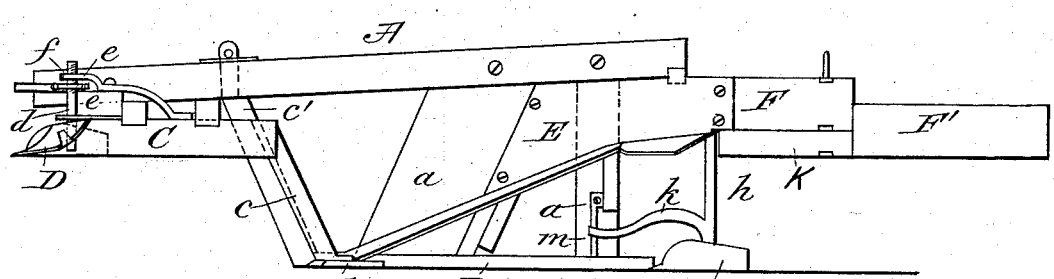
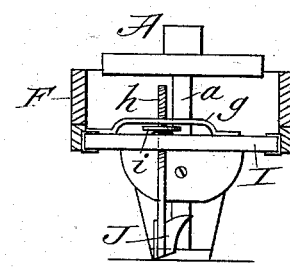
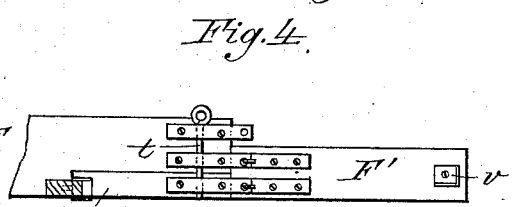
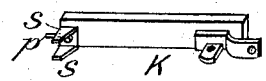
Attest:
H. H. Schott
A. R. Brown
Inventor:
John T. Miller
C. H. Watson & Co.
atty

UNITED STATES PATENT OFFICE.

JOHN T. MILLER, OF IOWA FALLS, IOWA.

DITCHING-PLOW.

SPECIFICATION forming part of Letters Patent No. 284,465, dated September 4, 1883.

Application filed June 2, 1883. (No model.)

*To all whom it may concern:*

Be it known that I, JOHN T. MILLER, a citizen of the United States, residing at Iowa Falls, in the county of Hardin and State of Iowa, have invented certain new and useful Improvements in Ditching-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the ditching-plow for which Letters Patent No. 62,215 were granted to me February 19, 1867; and the invention consists in the construction and arrangement of parts hereinafter more fully described and claimed.

In the annexed drawings, illustrating the invention, Figure 1 is a plan view of my improved ditching-plow. Fig. 2 is a side elevation of the same. Fig. 3 is a transverse section on the line $x\ x$ of Fig. 1. Figs. 4 and 5 are detail views of extensible wings. Fig. 6 is a side view of a concave plowshare to be attached to the rear end of the ditching-machine, and Fig. 7 is an end view of the same.

Like letters of reference are used to designate like parts in the several views.

A is the plow-beam, which is supported upon a frame, $a$, that rests on the sole-piece B. To the forward end of the sole B is secured a flat sharp-edged steel plate, $b$. The forward end of the plow-beam carries a cross-frame, C, which is connected to the plate $b$ by the inclined outwardly-flaring cutters, $c\ c$, a central cutter or sword-colter, $c'$, being arranged to extend from the pointed end of the plate $b$ to the plow-beam. The construction and arrangement of these parts is similar to that shown in my patent above mentioned.

To the forward end of the cross-frame C, on each side, is connected a plow, D, having a shank, $d$, provided with a threaded end that passes through bearings $e\ e$, and is held by a nut, $f$, so as to be adjusted up or down, as required.

The mold-boards E E, on each side, are preferably of a slight concave form, and are bolted to the frame $a$ and to the wings F F above the inclines G H. The wings F F are connected by a cross-piece, I, that supports a bearing, $o$, for the shank or standard $h^2$ of the rear plow, J, the vertical standard $h$ being provided with a nut, $i$, by which the plow is raised or lowered, and having also an arm, $k$, the end of which is hooked and engages with a guide-pin, $m$, by which the plow J is steadied.

The rear plow, J, may be made in the ordinary form shown in Figs. 2 and 3; or it may be made in the concaved or scoop form shown in Figs. 6 and 7, which will leave the trench or ditch with a rounded bottom for the reception of tile.

At the rear end of the wings F F, on the under side, are one or more removable sections, K K, that are secured to the wings by pins $p\ p$ and flanges $s\ s$ at one end and by thumb-screws $t\ t$ at the opposite or rear end; or other suitable fastenings may be employed. By means of these removable sections the machine may be readily adjusted to the depth of the ditch or height of its banks. The wings F F are also provided with extensions F' F', attached thereto by hooks and eyes or other suitable fastenings, the outer ends of said extensions being formed with flanges or bearings $v\ v$ for the support of a transverse brace, M, that steadies the extensions and assists in holding them in place. These extensions of the wings F F serve to thrust or carry the removed soil or débris farther away from the brink of the ditch, and thus obviate all liability of the dirt falling back into the ditch or being washed into it by rains.

In the operation of ditching it is necessary that the loose dirt should be removed as rapidly as possible, thereby avoiding liability of obstructing the plow, and leaving it free and clear to accomplish its work easily and effectually. This object is promoted by lowering the outer edges of the inclines G H to turn the dirt on the bank as quick as possible. The mold-boards E E are also set on a slight concave, so that by the time the dirt is two-thirds up the incline it is nearly all on the bank, and by the time it reaches the inclines H it is thrown on the bank upside down, and the dirt from the bottom of the ditch is sliding out the wings on top. The work is thus readily accomplished with the expenditure of but little power.

It will be seen that the various parts of the machine can be readily adjusted as needed, according to the requirements of the work to be done.

Having thus described my invention, what I claim as new, and desire to secure by Letters Patent, is—

1. In a ditching-machine, the combination, with the wings F F, of the removable sections K K, whereby the machine is adjusted to the depth of the ditch, substantially as described.

2. In a ditching-machine, the combination of the concaved mold-boards E E, the inclines G H, and the extensible wings F F', substantially as described.

3. In a ditching-machine, the combination, with the mold-boards E E, inclines G H, and wings F F, having removable sections K K, of the extensions F' F', detachably connected to the said wings and provided with bearings $v\,v$, and the brace M, supported in said bearings, substantially as described.

In testimony whereof I affix my signature in presence of two witnesses.

JOHN T. MILLER.

Witnesses:
C. M. HYER,
J. M. WOODWORTH.